Figure 1:
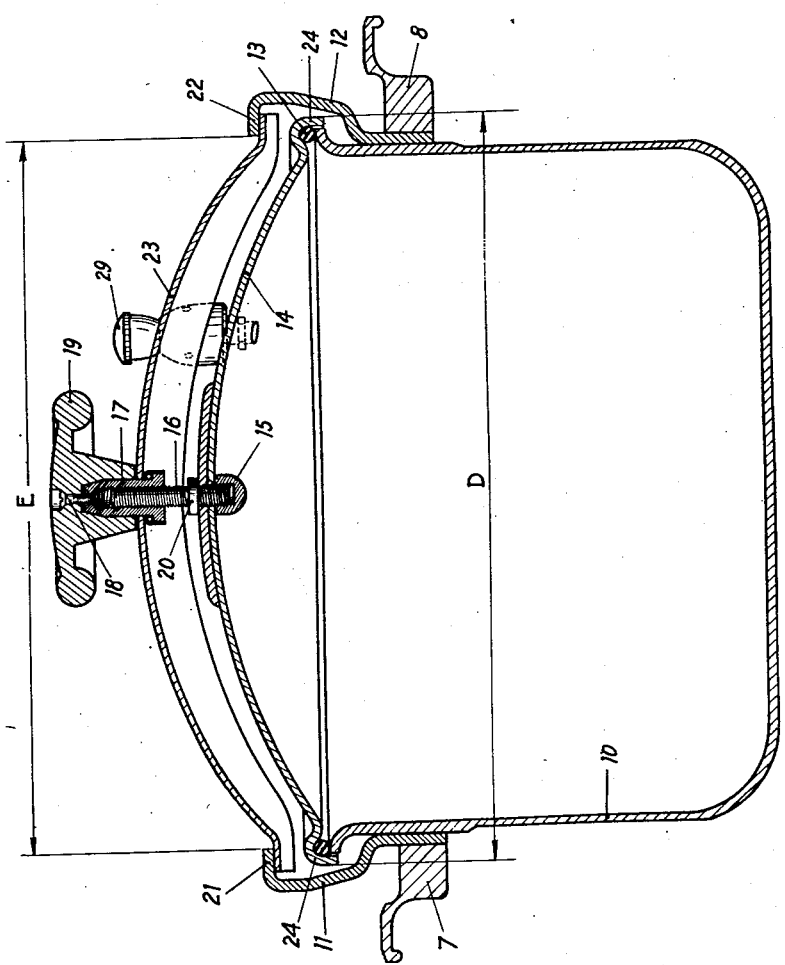

May 28, 1957     H. LESCURE     2,793,787
PRESSURE COOKERS

Filed May 16, 1955     4 Sheets-Sheet 1

INVENTOR
HENRI LESCURE
ATTYS.

May 28, 1957 H. LESCURE 2,793,787
PRESSURE COOKERS

Filed May 16, 1955 4 Sheets-Sheet 3

INVENTOR
HENRI LESCURE
By Young, Emery & Thompson
ATTYS.

May 28, 1957  H. LESCURE  2,793,787
PRESSURE COOKERS
Filed May 16, 1955  4 Sheets-Sheet 4
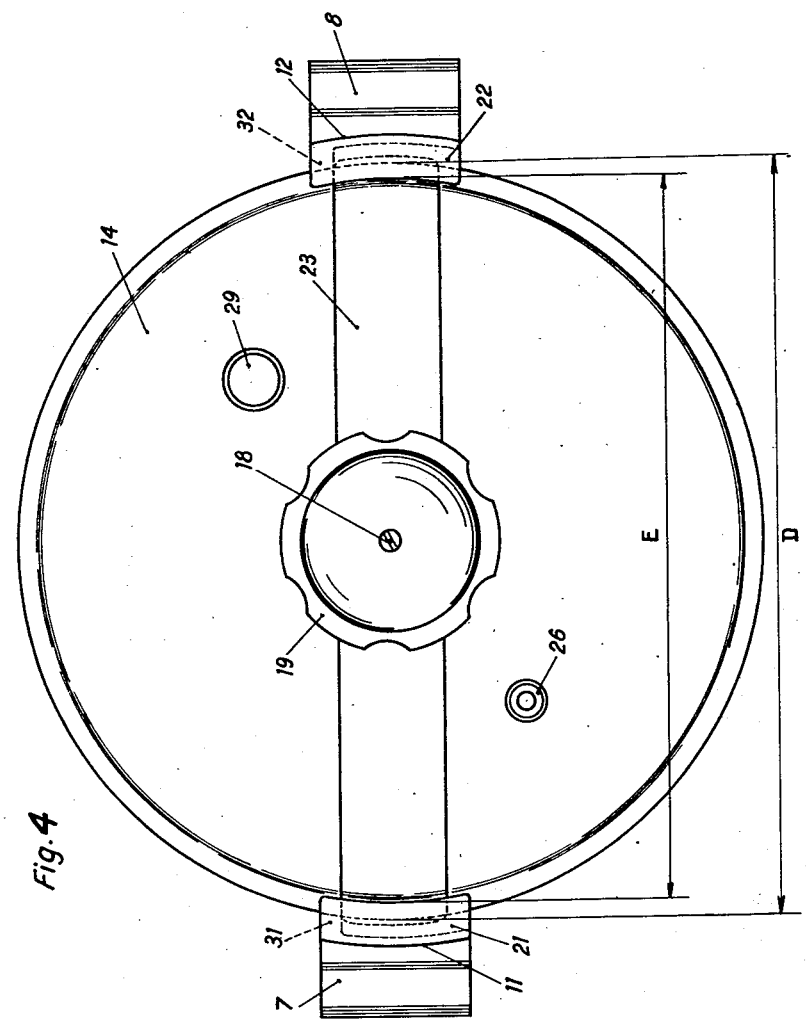
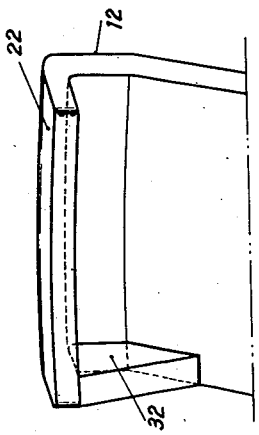
INVENTOR
HENRI LESCURE
By Young, Emery & Thompson
ATTYS.

United States Patent Office 2,793,787
Patented May 28, 1957

2,793,787

PRESSURE COOKERS

Henri Lescure, Selongey, France

Application May 16, 1955, Serial No. 508,571

Claims priority, application France June 2, 1954

1 Claim. (Cl. 220—57)

The present invention relates to pressure cookers for the cooking of food, and comprising, above the lid, a cross-bar tied thereto by an adjustable device and engaging, at its two ends, ears, secured to the body of the cooker at two diametrically opposite locations.

In cookers of this type, the closure is effected by moving, by a suitable control device, the cross-bar of the lid in such a manner that it bears on the ears of the body, applying the lid firmly over the periphery of said body.

The object of the present invention is to make improvements in pressure cookers of the above mentioned type, intended for avoiding any risk of serious accidents even if the cooker is used in an imprudent manner.

In fact, when closing the cooker, should the user omit engaging to a sufficient extent the ends of the cross-bar under the side ears of the body of the cooker, it could happen that, under the action of the inner pressure produced by heating, the cross-bar could slide suddenly while pivoting and could cease to bear on the ears. In such an occurrence, the lid being no longer held would be projected violently and could cause an accident.

According to the invention, in order to avoid such a risk, the cooker is built, in such a manner that the upper horizontal rims of the ears carried by the body of the cooker have an extent, towards the center, such that the diametral spacing between these rims be definitely less than the diameter of the lid.

Owing to the arrangement thus adopted, should, due to the carelessness of the user, the cross-bar pivot spontaneously and move away from the ears, the lid rises, but it meets immediately the rims of the ears and is held by them, while the steam escaping between the lid and the body of the cooker remains directed downwards by the peripheral rim of the lid; thus no accident is to be feared.

It is possible, further, to obtain an additional safety by compelling the user to place the cross-bar in a correct position with respect to the ears of the body.

To this effect, according to a preferred embodiment of the invention, the diametrically opposed ears of the body of the cooker support, on the same side of the diametral plane going through the middle of these ears, stops which limit the horizontal displacement of the cross-bar when placing the lid above the body.

These stops may preferably consist of two vertical walls placed facing each other and forming the ears on one side.

Figure 2:
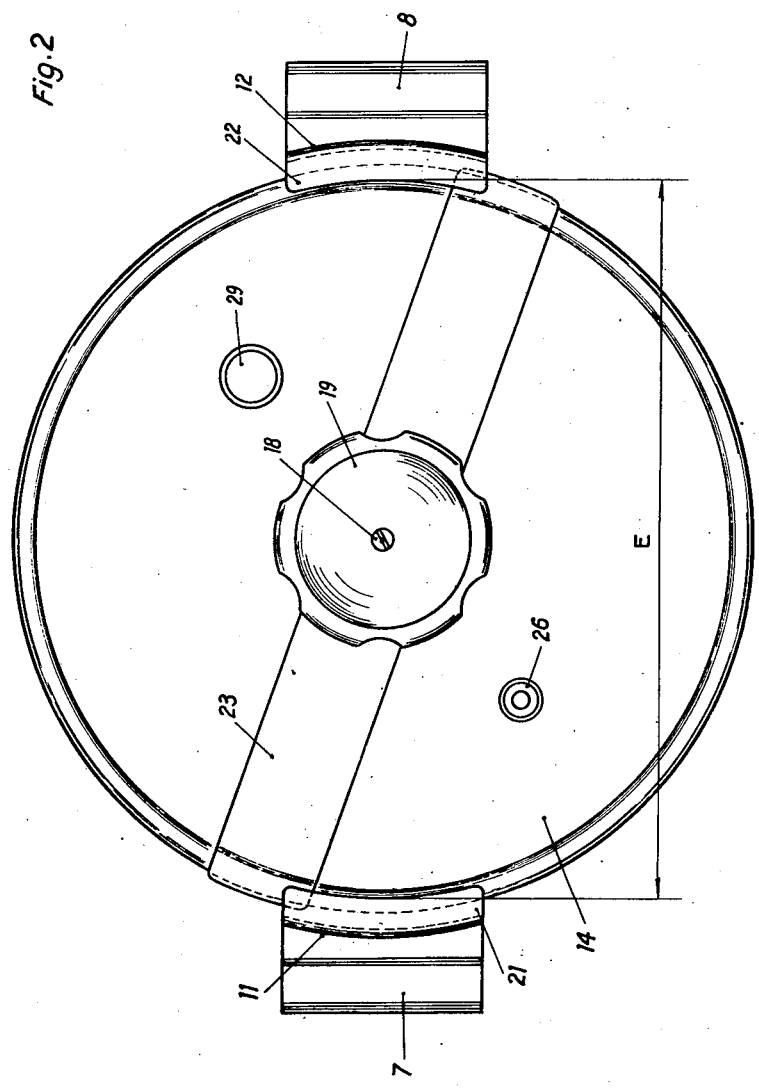

Two types of embodiment of a pressure cooker according to the invention are represented, by way of example, in the appended drawings, wherein:

Figures 1 and 2 refer to a first embodiment. Figure 1 is a section in elevation of the cooker. Figure 2 is a plane view of the cooker, the cross-bar being assumed to be insufficiently engaged under the ears.

Figure 3:
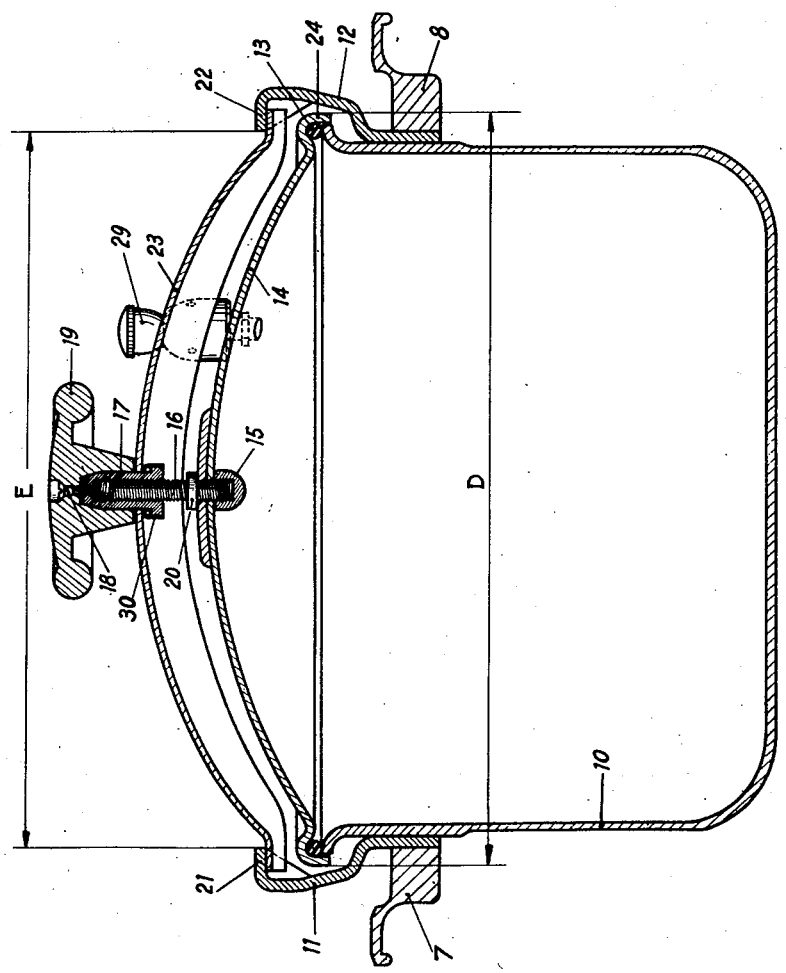

Figures 3 to 5 represent another embodiment. Figure 3 is a vertical section of the cooker, the section plane coinciding with the plane of symmetry of the cross-bar. Figure 4 is a plane view corresponding to Figure 1.

Figure 5 is a view in perspective showing one ear of the cooker.

In Figures 1 and 2, 10 designates the body of the cooker, comprising laterally two ears 11 and 12, attached to the body by riveting or by welding. These ears offer, at their upper portions, horizontal rims 21, 22 oriented towards each other.

On the upper rim of the edge of the body 10, there may be applied, with an interposition of a plastic gasket 13, a circular lid 14, at the center of which a threaded pin 16 is secured by means of nuts 15 and 20.

A socket-nut 17 to which a control knob 19 of insulating material is attached by a screw 18, is screwed on the pin 16.

The socket-nut 17 is engaged in an aperture provided at the middle of a cross-bar 23, relatively elastic, and it supports a base 30 wider than said aperture. The two ends of the cross-bar 23 hook under the upper horizontal rims 21 and 22 of the ears 11 and 12. By means of such an arrangement, it is possible, by screwing in the pin 16, to move the lid 14 downwards on the body 10 by crushing slightly the gasket 13, which ensures a tight closure of the body 10.

The lid 14 offers, over its entire periphery, a rim 24 bent downwards. The apparatus is completed by a pressure limiter 29, of a known construction, consisting in a bell shaped valve which opens and rotates upon itself under the action of the steam jet so as to warn the user that the desired pressure has been reached. In addition, a safety valve, also known, has been provided at 26.

According to the invention, the horizontal rims 21 and 22 of the ears 11 and 12 are given an extent towards the center, such that the spacing E between the two rims be definitely less than the diameter D of the lid; the result is that this lid can no longer be separated from the body of the cooker by a vertical raising; for opening the cooker, the user must lift the lid, so that the rim 24 be higher than the edge of the body 10, then slide the lid horizontally between the ears 11 and 12.

For closing the cooker, the converse operation is used.

The user first engages the lid horizontally between the ears 11 and 12, under the horizontal rims 21 and 22, then, when the lid is coaxial with the body 10, it is allowed to rest, by its gasket 13 on the upper edge of the body 10. Then the user engages, by pivoting, the ends of the cross-bar 23 under the rims 21 and 22 of the ears 11 and 12 and there only remains to turn the knob 19 in order to ensure the closing of the cooker.

Should the user, inadvertently, engage only partly the ends of the cross-bar 23 under the rims 21 and 22 as shown in Figure 2, it may happen, even if the knob 19 has been tightened correctly afterwards, that under the action of the inside pressure of the cooker, the cross-bar 23 is disengaged spontaneously from the rims 21 and 22; the lid 14 then rises suddenly, but nothing serious can happen, as the lid remains held by the rims 21 and 22 and the escaping steam is directed downwards by the rim 24 of the lid.

Another form of embodiment of the cooker is represented in Figures 3, 4 and 5, where the main elements, already described are found again, and in particular the body 10 with its ears 11 and 12, the lid 14 with the central pin 16 on which the socket-nut 17 is mounted with its control knob 19, the vertical displacement of which controls that of the cross-bar 23 engaged under the rims 21 and 22 of the ears 11 and 12.

As in the case of Figures 1 and 2, the rims 21 and 22 offer, towards the center, a sufficient extent for the spacing E between the two rims to be definitely less than the diameter D of the lid.

According to Figures 3 to 5, the ears 11 and 12 have, on the same side of the plane of symmetry going through the middle of these ears, stops intended for limiting the horizontal displacement of the cross-bar 23 when the lid is brought above the body 10. In accordance with the type of embodiment represented, these stops are constituted by partitions 31 and 32 closing, on the same side, the ears 11 and 12 respectively.

When, after placing in the cooker the food to be cooked, the user wishes to close the cooker, he first turns in a suitable direction the knob 19, so as to lower the cross-bar 23 as much as possible with respect to the lid 14, then he engages horizontally the cross-bar and lid in the ears 11, 12, on the opposite side to the partitions 31 and 32 until the two ends of the cross-bar abut against these partitions. The user then turns the knob 19 in opposed direction to the above, so as to raise the cross-bar 23 which is applied under the rims 21 and 22, then, continuing this rotation of the knob 19, he lowers the lid which comes and sits on the body 10, compressing the plastic gasket 13.

When the cooker is closed, there is, in the horizontal direction between the cross-bar 23 and rim 24 the partitions 31 and 32, either a contact or a small space.

It may be seen thus, that the user may effect the closing of the cooker without any groping. The cross-bar 23 occupying necessarily a correct position by virtue of the presence of the partitions 31 and 32, there can occur, with this cross-bar no untimely pivoting liable to cause a lifting of the lid.

It should be understood that the invention is not limited to the form of embodiment shown in the drawings, and that any modification may be made to the construction within the scope of the invention. Thus, instead of closing the side ears by partitions, stops of any shape could be arranged on these ears, limiting the horizontal displacement of the cross-bar.

I claim:

A pressure cooker comprising a body having an outwardly curved rim, a pair of diametrically opposed upstanding ears secured to the body in spaced relation from the rim of the body, said ears each having an inwardly turned portion and a partition closing one side of said ear, said partitions being located on the same side of an axial plane passing through the middle of said ears, a lid for hermetically closing said body and having a convex outer body portion and a downwardly bent rim for tight engagement with the rim of the body, a threaded pin secured to said lid at the top thereof, a nut in mesh with said threaded pin, a cross-bar idly fitted on said nut and having its ends engaging the inwardly turned portions of said ears, and a control knob secured to said nut and engaging said cross-bar to raise the ends of the cross-bar for tight engagement with the inwardly turned portions of the ears, with said partitions serving as abutments and limiting the horizontal displacement of the ends of the cross-bar.

References Cited in the file of this patent

UNITED STATES PATENTS

| 1,558,349 | Graaff | Oct. 20, 1925 |
| 2,653,729 | Richter | Sept. 29, 1953 |

FOREIGN PATENTS

| 397,931 | France | May 21, 1909 |
| 714,370 | France | Sept. 1, 1931 |